E. E. JESPERSEN.
CORN ELEVATOR.
APPLICATION FILED APR. 1, 1918.
1,365,173.
Patented Jan. 11, 1921.
2 SHEETS—SHEET 2.
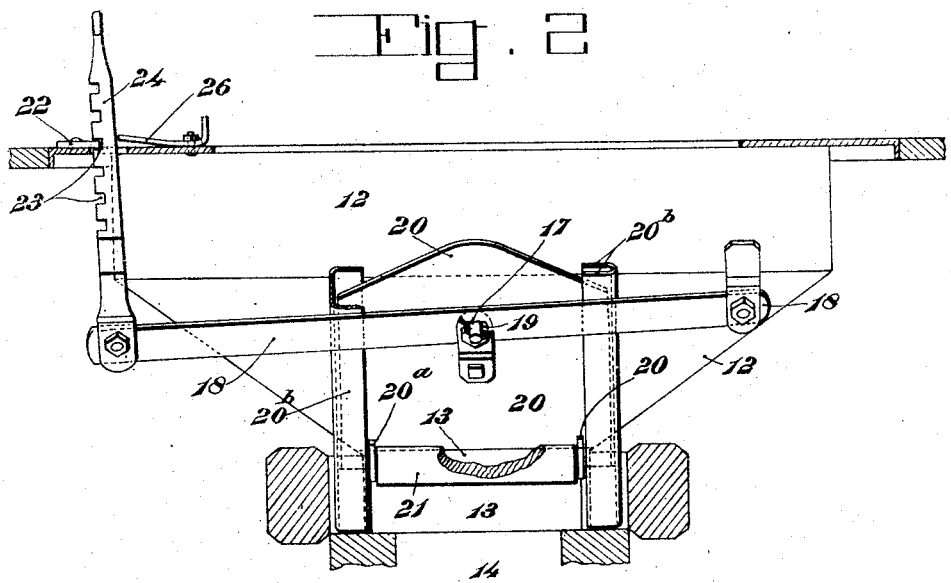
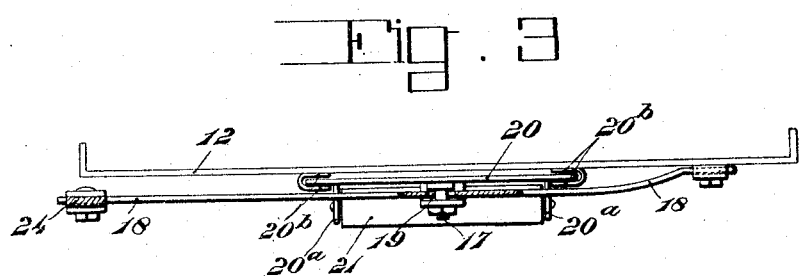
Inventor:
Elmer E. Jespersen,
By
Attorneys.

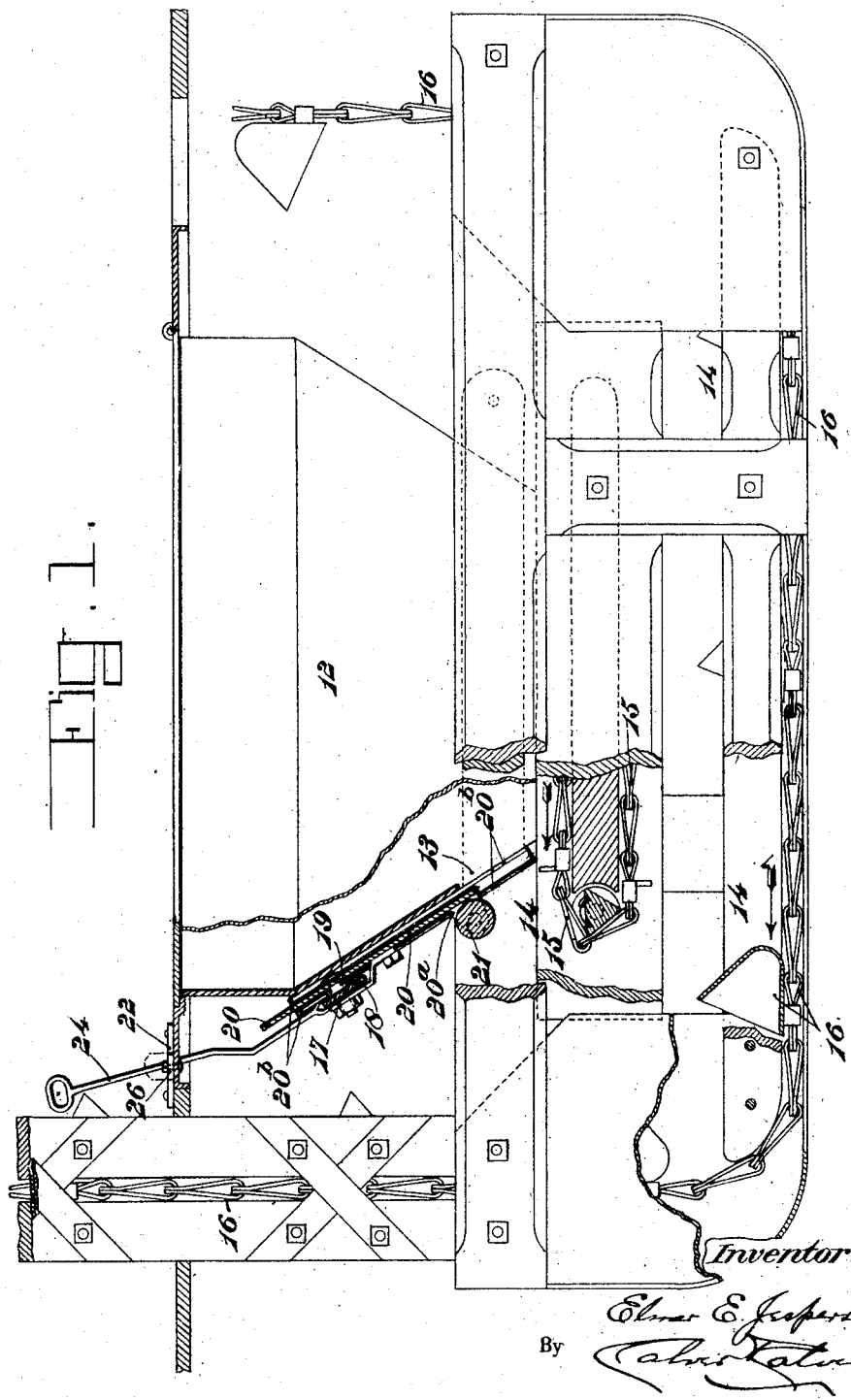

UNITED STATES PATENT OFFICE.

ELMER E. JESPERSEN, OF ASHLAND, NEBRASKA.

CORN-ELEVATOR.

1,365,173.  Specification of Letters Patent.  Patented Jan. 11, 1921.

Application filed April 1, 1918. Serial No. 225,933.

*To all whom it may concern:*

Be it known that I, ELMER E. JESPERSEN, a citizen of the United States, residing at Ashland, in the county of Saunders and State of Nebraska, have invented or discovered certain new and useful Improvements in Corn-Elevators, of which the following is a specification, reference being had therein to the accompanying drawings.

This invention relates to a gate for regulating the outward feed of ears of corn from a hopper or pit, into which they are dumped, to the boot of an endless-chain bucket elevator which carries the corn upward to be discharged through a suitable spout or chute into a corn crib. In corn elevators of the class to which this invention relates an endless carrier, geared to the endless-chain bucket elevator and arranged in the bottom of the pit hopper, conveys the ears of corn through a suitable opening in the receiving pit hopper to the boot of the elevator, but unless the discharge from the hopper into the boot of the elevator is properly regulated the elevator is liable to become clogged. If an ordinary adjustable sliding gate be employed for regulating the discharge from the hopper to the elevator boot more or less corn is liable to be shelled from the ears as the latter are fed through the discharge opening from the hopper to the elevator boot; and for this reason the present invention comprises an adjustable feed regulating gate which is provided at its bottom with an anti-friction roller so that as the ears of corn are fed outward into the elevator boot shelling of the corn from the ears is avoided, and the danger of clogging the lifting apparatus by the shelled corn is thus also avoided.

In the accompanying drawings Figure 1 is a sectional view of the lower part of a pit corn elevator embodying the present invention, and Fig. 2 is a partial section, at right angles to Fig. 1, showing the front end of the hopper and the improved feed regulating gate. Fig. 3 is a detail top view of the feed regulating gate.

Referring to the drawings, 12 denotes a hopper, to be arranged in a suitable pit conveniently adjacent to the bin or bins in the corn crib in which the corn is to be stored. The hopper 12 is provided at one end with a discharge opening at 13 communicating with the chamber 14 of the elevator boot. At the bottom of the hopper 12 is arranged an endless belt conveyer 15 which will carry the ears of corn outward through said opening into the chamber of the said boot, this endless conveyer being, in practice, geared to the operating mechanism of an endless-chain bucket elevator 16 of well known or suitable construction, and only a portion of which is herein shown.

Pivoted at 17 at one side of the hopper 12 is a lever 18 having a pin-and-slot connection, at 19, with an adjustable gate 20 working in guides $20^b$ attached to the hopper 12; said gate being provided at its bottom with an anti-friction roller 21 which serves as the contact portion of said gate for the ears of corn fed outward through the discharge opening in the hopper. The roller 21 is suitably supported by ears or brackets $20^a$ on the gate 20. The feed regulating gate 20 may be held in any desired position of adjustment by means of a stop 22 adapted to engage any one of a series of notches 23 formed in a regulating bar 24 attached to the free end of the lever 18, and which bar will be retained in contact with the said stop my means of a locking device of any suitable construction and which, in the present instance, consists of a pivoted bar or plate 26 which may be turned or swung to one side horizontally when it is desired to disengage the regulating bar 24 from said stop.

From the foregoing it will be understood that the feed regulating gate 20 may be raised and lowered, as may be desired, to increase or diminish the outward discharge of the corn from the hopper 12, and may be secured in any desired position of adjustment by means of the holding and locking devices shown; while the anti-friction roller at the bottom of the gate will permit the proper discharge of the ears of corn from the hopper without danger of shelling off the corn from the ears.

The adjustable feed regulating gate 20 is loosely mounted, so as to slide up and down easily, in the guides $20^b$. Said gate may be of wood or metal, as may also the contact roller 21, the latter being of a length approximately equal to the width of the discharge opening in the hopper or corn receptacle.

Having thus described my invention I claim and desire to secure by Letters Patent:

1. In a corn elevator, the combination with a hopper provided at one side of its lower part with a discharge opening, of a feed-regulating gate for varying the working size of said opening, a lever having a pin-and-slot connection with said gate, a stop, a feed-regulating bar attached to said lever and provided with a series of notches to engage said stop, and a horizontally swinging pivoted bar or plate adapted to be moved out of or into engagement with said notched feed-regulating bar, so as to serve as a locking device for positively holding said feed-regulating bar in engagement with said stop.

2. In a corn elevator, the combination with a hopper provided at one side of its lower part with a discharge opening, of a feed-regulating gate for varying the working size of said opening, said gate having an anti-friction contact roller at its bottom, a lever having a pin-and-slot connection with said gate, a stop, a feed-regulating bar attached to said lever and provided with a series of notches to engage said stop, and a horizontally swinging, pivoted locking device for positively holding said feed-regulating bar in engagement with said stop.

In testimony whereof I affix my signature.

ELMER E. JESPERSEN.